US009747245B2

(12) United States Patent
Guddeti et al.

(10) Patent No.: US 9,747,245 B2
(45) Date of Patent: Aug. 29, 2017

(54) METHOD, APPARATUS AND SYSTEM FOR INTEGRATING DEVICES IN A ROOT COMPLEX

(71) Applicant: Intel Corporation, Santa Clara, CA (US)

(72) Inventors: Jayakrishna Guddeti, Bangalore (IN); Luke Chang, Aurora, OR (US); Junaid F. Thaliyil, Bangalore (IN); Chandra P. Joshi, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 99 days.

(21) Appl. No.: 14/573,738

(22) Filed: Dec. 17, 2014

(65) Prior Publication Data

US 2016/0179738 A1 Jun. 23, 2016

(51) Int. Cl.
*G06F 13/12* (2006.01)
*G06F 13/00* (2006.01)
*G06F 13/42* (2006.01)
*G06F 11/30* (2006.01)
*G06F 13/16* (2006.01)
*G06F 13/24* (2006.01)
*G06F 13/40* (2006.01)

(52) U.S. Cl.
CPC ...... *G06F 13/4221* (2013.01); *G06F 11/3027* (2013.01); *G06F 13/1642* (2013.01); *G06F 13/24* (2013.01); *G06F 13/4022* (2013.01)

(58) Field of Classification Search
None
See application file for complete search history.

(56) References Cited

U.S. PATENT DOCUMENTS

| 7,873,068 | B2 | 1/2011 | Klinglesmith et al. |
|---|---|---|---|
| 8,170,062 | B2 | 5/2012 | Wagh et al. |
| 8,711,875 | B2 | 4/2014 | Lakshmanamurthy et al. |
| 8,713,234 | B2 | 4/2014 | Lakshmanamurthy et al. |
| 8,713,240 | B2 | 4/2014 | Lakshmanamurthy et al. |
| 8,775,700 | B2 | 7/2014 | Lakshmanamurthy et al. |
| 8,805,926 | B2 | 8/2014 | Lakshmanamurthy et al. |
| 8,874,976 | B2 | 10/2014 | Lakshmanamurthy et al. |
| 2005/0223139 | A1 | 10/2005 | Wagh et al. |

(Continued)

OTHER PUBLICATIONS

International Searching Authority, "Notification of Transmittal of the International Search Report and the Written Opinion of the International Searching Authority," mailed Feb. 18, 2016 in International application No. PCT/US2015/061093.

(Continued)

*Primary Examiner* — David E Martinez
(74) *Attorney, Agent, or Firm* — Trop, Pruner & Hu, P.C.

(57) ABSTRACT

In an embodiment, an apparatus comprises: a semiconductor die including but not limited to: at least one core to execute instructions; an agent to perform at least one function; a root complex including a first root port to interface to a first device to be coupled to the apparatus via a first interconnect and a second root port to interface to the agent via a bridge logic; and the bridge logic to interface the second root port to the agent, convert a first transaction from the first root port having a first format to a second format and communicate the first transaction having the second format to the agent. Other embodiments are described and claimed.

26 Claims, 13 Drawing Sheets

(56) References Cited

U.S. PATENT DOCUMENTS

| | | | |
|---|---|---|---|
| 2007/0266179 A1* | 11/2007 | Chavan | G06F 13/4022 709/250 |
| 2009/0119432 A1 | 5/2009 | Lee et al. | |
| 2010/0329254 A1 | 12/2010 | Chen et al. | |
| 2013/0054845 A1* | 2/2013 | Nimmala | G06F 13/4022 710/36 |
| 2013/0054856 A1 | 2/2013 | Lim et al. | |
| 2013/0083798 A1 | 4/2013 | Lakshmanamurthy et al. | |
| 2013/0138858 A1 | 5/2013 | Lakshmanamurthy et al. | |
| 2013/0151750 A1 | 6/2013 | Kanigicherla et al. | |
| 2014/0129747 A1 | 5/2014 | Ajanovic et al. | |
| 2014/0258492 A1 | 9/2014 | Lakshmanamurthy et al. | |
| 2014/0258578 A1 | 9/2014 | Lakshmanamurthy et al. | |
| 2014/0258583 A1 | 9/2014 | Lakshmanamurthy et al. | |
| 2014/0289435 A1 | 9/2014 | Lakshmanamurthy et al. | |

OTHER PUBLICATIONS

Taiwan Intellectual Property Office, Office Action mailed Oct. 25, 2016, in Taiwan Patent Application No. 104136859. (Translation Redacted).

* cited by examiner

METHOD, APPARATUS AND SYSTEM FOR INTEGRATING DEVICES IN A ROOT COMPLEX

FIELD OF THE INVENTION

This disclosure pertains to computing systems, and in particular (but not exclusively) to integrating devices to couple to a root complex.

DETAILED DESCRIPTION

Figure 1:
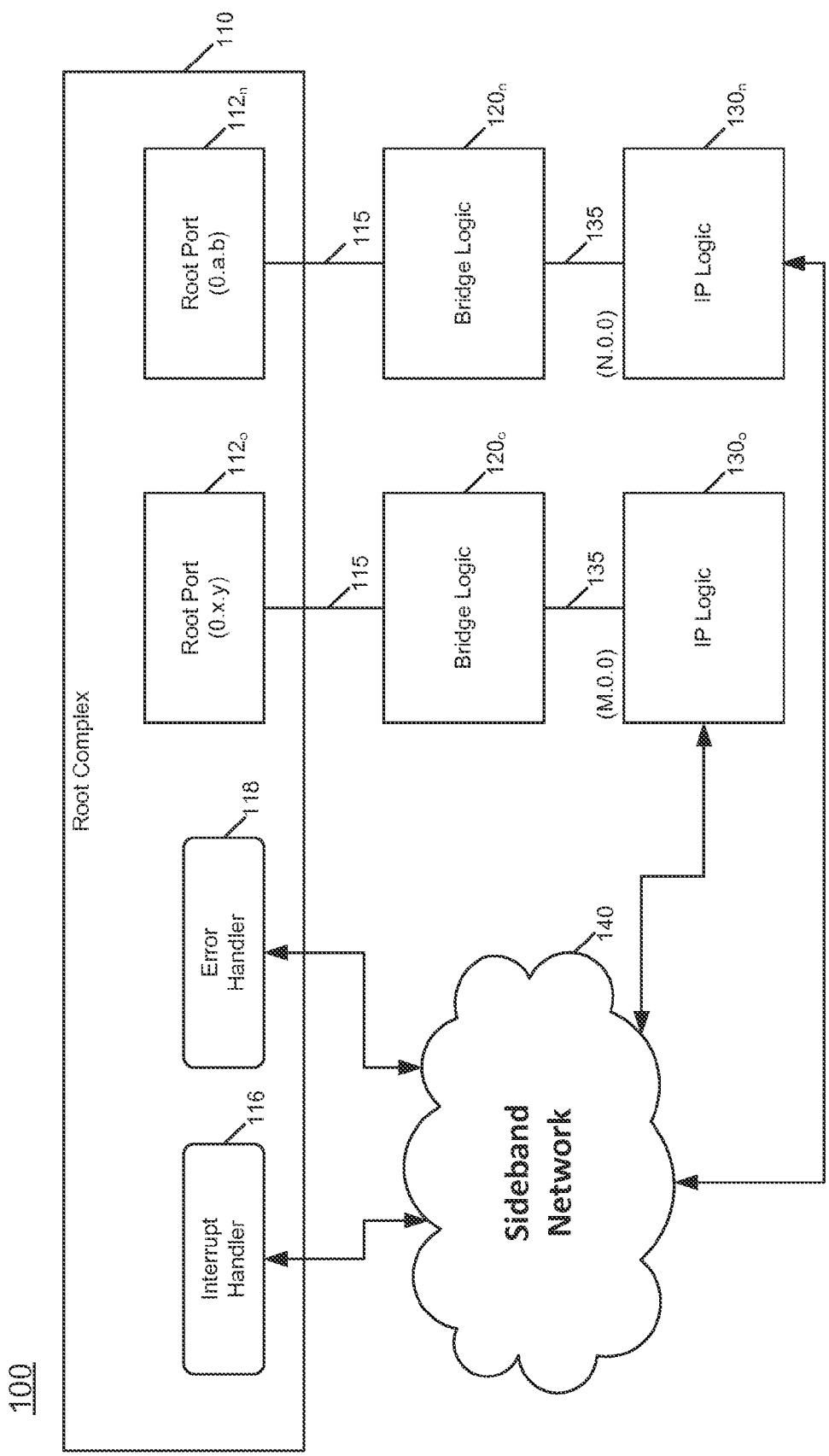
FIG. 1 is a block diagram of a portion of an SoC in accordance with an embodiment of the present invention.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of embodiments of the present invention. It will be apparent, however, to one skilled in the art that these specific details need not be employed to practice embodiments. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the described embodiments.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™, and may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it is a singular purpose of most fabrics to provide highest possible performance with maximum power saving. Below, a number of interconnects are discussed, which would potentially benefit from embodiments described herein.

A root complex such as a Peripheral Component Interconnect Express (PCI Express (PCIe)) root complex typically includes multiple root ports, each having a full protocol stack (physical, link, transaction and protocol) compatible with a given PCIe communication protocol such as described in the Peripheral Component Interconnect Express (PCI Express (PCIe)) Specification Base Specification version 2.0 (published 2007) or other such specification (hereafter the PCIe specification)). These root ports provide an interface for an integrated circuit including the root complex (such as a system on chip (SoC) or other processor), so that devices of a platform can be coupled to the root complex via the corresponding root port.

A PCIe root port provides a capability to allocate non-zero bus numbers to PCIe devices, which in turn enables single root input/output (I/O) virtualization (SRIOV), such that these devices can be enumerated with a large number of virtual functions. Embodiments described herein enable one or more devices integrated within a given SoC or other processor to support SRIOV. Stated another way, embodiments provide support for a non-zero bus number enumeration (and hence SRIOV) for root complex-integrated devices, in that such devices are integrated in the same die as root complex, but not in the root complex itself.

In some embodiments, the integrated device may support a protocol different than PCIe. For example, in some cases, such integrated device may support compatibility with a given communication protocol such as an integrated on-chip system fabric (IOSF) specification issued by a semiconductor manufacturer or designer to provide a standardized on-die interconnect protocol for attaching intellectual property (IP) blocks or logic ("block" and "logic" are used interchangeably herein) within a chip such as a SoC. Such IP blocks can be of varying types, including general-purpose processors such as in-order or out-of-order cores, fixed function units, graphics processors, IO controllers, display controllers, media processors among many others. Note that many different types IP agents can be integrated in different types of chips. Accordingly, not only can the semiconductor manufacturer efficiently design different types of chips across a wide variety of customer segments, it can also, via the specification, enable third parties to design logic such as IP agents to be incorporated in such chips. And furthermore, by providing multiple options for many facets of the interconnect protocol, reuse of designs is efficiently accommodated.

To enable a non-PCIe device to interface to a PCIe root complex, a bridge logic may be adapted between root port and IP block. In an embodiment, primary logic of this IOSF-PCIe bridge interfaces a PCIe transaction layer of the root port to the IOSF protocol, and thus performs protocol and interface conversion between PCIe and IOSF protocols. In an embodiment, this conversion takes parallel IOSF communications and converts them to PCIe serial communications and vice versa. Still further, the bridge logic implements link initialization logic, to map IOSF link initialization processes to PCIe link initialization processes. The bridge logic may further implement a PCIe credit handling mechanism to translate credits from PCIe credits to IOSF credits and vice versa. In addition, the bridge logic supports legacy interrupts and error messages, which are communicated on a sideband interface, and the bridging logic implements interfacing these sideband messages into the root port. Still further, the bridging logic may include an idle state management logic to enable interaction of idle and power management flows of the IOSF protocol, to map to various rules of a PCIe protocol.

Embodiments thus support SRIOV for one or more integrated IP blocks within a SoC or other processor, by interfacing with a root complex having logic as described herein via a bridge logic. In some cases, the integrated IP block may couple to a PCIe root port via an on-die secondary interconnect such as an IOSF protocol interconnect as described herein. Embodiments can be used in many different types of systems. As examples, implementations described herein may be used in connection with semiconductor devices such as processors or other semiconductor devices that can be fabricated on a single semiconductor die. In particular implementations, the device may be a SoC or other advanced processor or chipset that includes various homogeneous and/or heterogeneous processing agents, and additional components such as networking components, e.g., routers, controllers, bridge devices, devices, memories and so forth.

Referring now to FIG. 1 shown is a block diagram of a portion of an SoC in accordance with an embodiment of the present invention. As shown in FIG. 1, this SoC portion 100 includes a root complex 110, which may be a PCIe root complex. Note that only portions of the root complex are shown for ease of illustration. Specifically shown are root ports $112_0$-$112_n$. These root ports may interface on a downstream side with interface or bridge logic as described herein. Specifically shown in FIG. 1, bridge logics $120_0$-$120_n$ interface between corresponding IP logics $130_0$-$130_n$, which may be logic blocks of an IOSF protocol and root ports $112_0$-$112_n$.

In different embodiments root complex 110 may include multiple PCIe root ports, which may be standalone ports or wider ports bifurcated into smaller ports. Such root ports that are to interface to non-integrated (off-die) devices are not shown for ease of illustration. Bridge logic 120 can be instantiated for each root port 112 that is to connect to IP block 130 on the other side of the bridge. Bridge logic 120 may couple to corresponding root port 112 using a PCIe serial interface, where both header and data information are sent serially at a transaction level via a single interconnect. On the other side of bridge logic 120, an interconnect 135, which may be an IOSF fabric, is configured with a parallel bus protocol, in which header and data information are sent on independent interconnects. Thus bridge logic 120 is configured to communicate via a PCIe-based link 115 (that communicates at a transaction level as described herein) on an upstream side to root complex 112 and via an IOSF link 135 downstream to corresponding IP logic 130.

Still referring to FIG. 1, IP logic 130 is coupled to a sideband network 140 which in an embodiment is an IOSF sideband fabric that couples to root complex 110, and more specifically to an interrupt handler 116 and error handler 118. As seen in FIG. 1, IP logic 130 supports legacy interrupts (e.g., INTA/B/C/D) and error messages (fatal, non-fatal and correctable), which are communicated via sideband network 140. Interrupt handler 116 and error handler 118 interface to sideband network 140 and convert the sideband messages into the root port's primary interrupt and error logic, respectively (not shown for ease of illustration). Note that such handlers are typically not present in PCIe interrupt complexes but instead are configured here to provide an interface to handle various legacy interrupt error messaging communicated by IP logic blocks 130 via sideband network 140. Although shown at this high level in the embodiment of FIG. 1, variations are possible.

Figure 2:
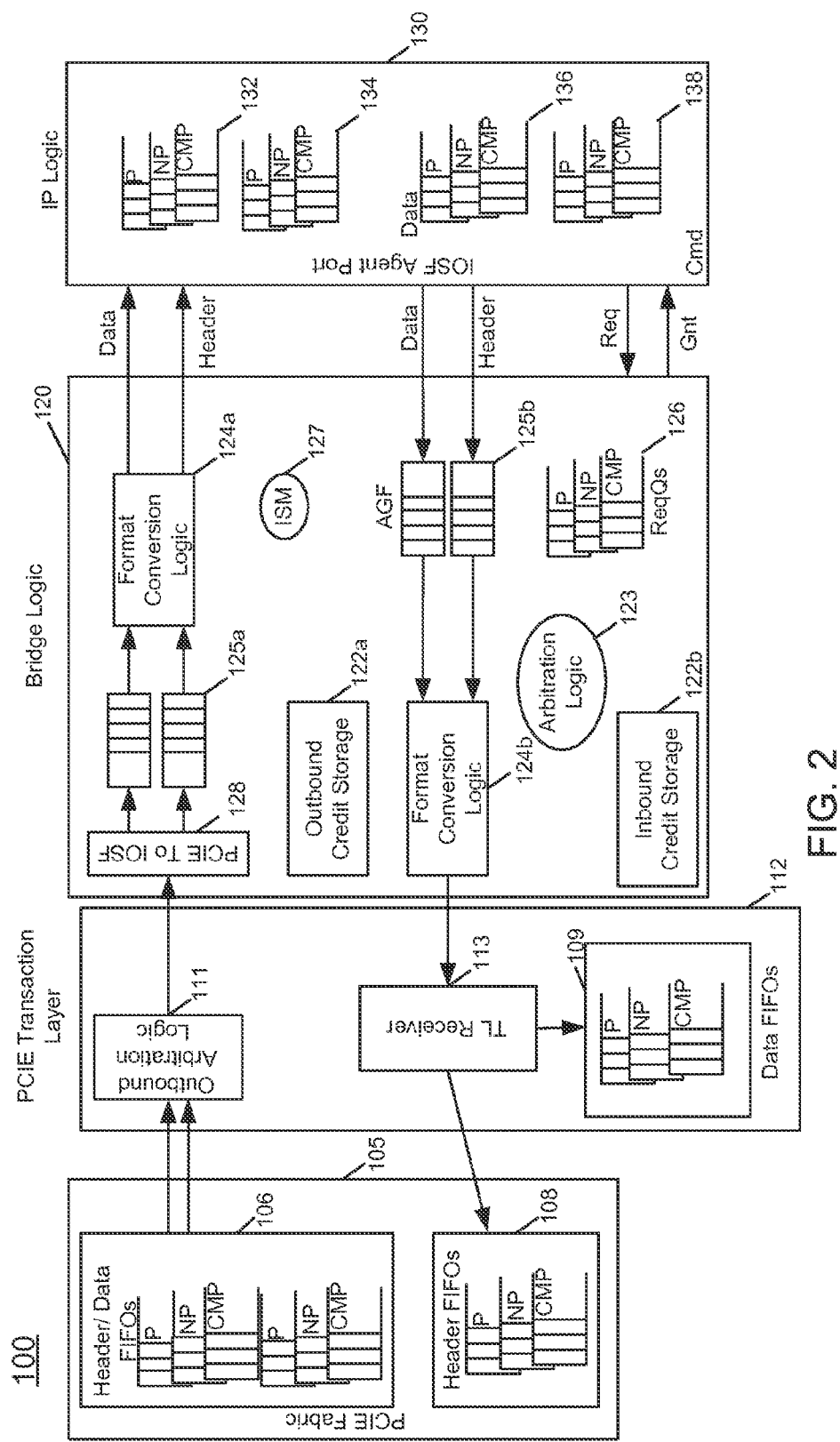
FIG. 2 is a block diagram in which a PCIe fabric couples to a PCIe transaction layer of a corresponding root port in accordance with an embodiment of the present invention.

Referring now to FIG. 2, SoC 100 is shown in another view in which a PCIe fabric 105 couples to a PCIe transaction layer of a corresponding root port 112. As shown, PCIe fabric 105 includes an outbound buffer 106. In an embodiment, buffer 106 may be arranged as separate first in first out (FIFO) buffers for each of multiple message classes (posted, non-posted, and completion), separated for header and data information. In turn, on an inbound path, an inbound buffer 108 may be implemented as multiple header FIFOs for each of the separate message classes. While inbound data FIFO 109 is shown as part of root port 112 in the embodiment of FIG. 2 understand that in other cases this buffer may be part of PCIe fabric 105.

With reference now to root port 112, note that root port 112 includes only a transaction layer and does not include a link layer or physical layer (note that other instantiated ports configured to communicate off-chip (not shown in FIG. 2) may be conventional root ports having all of transaction, link and physical layers). In the embodiment shown, root port 112 includes buffer 109, implemented as data FIFO's, and a transaction layer receiver 113 to interface between bridge logic 120 and PCIe fabric 105 in an upstream direction. Root port 112 further includes an outbound arbitration logic 111 configured to interface between PCIe fabric 105 and bridge logic 120 in a downstream direction.

With reference now to details of bridge logic 120, in a downstream direction, a first interface logic 128 is configured to adapt incoming transactions from PCIe to IOSF format, namely separating such transactions into header and data information, and providing the information to separate paths of a clock crossing logic 125*a*, implemented in the embodiment shown as an asynchronous Gray-coded FIFO (AGF). In turn, AGF 125*a* is coupled to a format conversion logic 124*a*. In this downstream direction, format conversion logic 124*a* is configured to convert incoming transaction layer packets to IOSF format and output separate data and header information on separate data and header links of a primary IOSF interconnect 135 that couples between bridge logic 120 and IP logic 130.

In an upstream direction, bridge logic 120 includes an AGF 125*b* to receive incoming data and header information from IP logic 130 and perform clock transformation as appropriate and provide the separated data and header information to a format conversion logic 124*b*, which converts the information from IOSF to the PCIe transaction layer format.

Still referring to bridge logic 120, a set of request queues 126 are provided for storing incoming requests. Bridge logic 120 also includes shadow storages for credit information, including an outbound credit storage 122*a*, which stores information regarding available credits with regard to IP logic 130 and an inbound credit storage 122*b*, which stores information regarding available credits with regard to root port 112/PCI fabric 105. As further seen, bridge logic 120 also includes an arbitration logic 123 configured to perform arbitration with regard to upstream communications and providing corresponding grants to IP logic 130, e.g., based on available credits and pending requests in request queues 126. Still further with reference to bridge logic 120, an idle state machine (ISM) 127 is present which may map PCIe-based link initialization processes to IOSF-based initialization processes for interconnect 135 and perform power management activities.

In the downstream direction, bridge logic 120 implements a request-grant based protocol, where IP block 130 puts requests of transactions (posted, non-posted and completions) with size of payload information. In turn, arbitration logic 123 checks for both header and data credits advertised by root port 112, before giving a grant to a particular request. Once a transaction wins an inbound arbitration in bridge logic 120, it is guaranteed to be sunk by root port 112.

In a given implementation, the IOSF interface (and hence IOSF arbitration and credit counters) may be in a different clock frequency when compared to root port 112. In this scenario, the credit exchange from root port 112 to bridge logic 120 happens through clock domain crossing logic 125*b* (e.g., an asynchronous Gray-coded FIFO). As shown in FIG. 2, the header and data links from IP logic 130 are coupled through clock domain crossing logic 125*b*, to match different clock domains in root port 112 and bridge logic 120. Arbitration logic 123 ensures PCIe ordering rules are followed when granting a particular transaction from IP block 130 to root port 112. Format conversion logic 124*b* converts inbound transactions from an IOSF protocol format to a PCIe protocol format, so that the packet can be understood by root port 112. Along with format conversion, conversion logic 124*b* also implements parallel to serial conversion. As shown in FIG. 2, IP logic 130 sends header and data information on different interconnects. Format conversion logic 124*b* takes this header and data information, and serializes it into a serial stream, with start and end markers, as understood by root port 112 to indicate a beginning/end of packet.

For the transactions to be sent from root port 112 to IP block 130, arbitration logic 111 in root port 112 arbitrates based on the available packets in outbound FIFOs 106 and outbound credits available on IP block 130, as indicated by information in credit storage 122*a*. Bridge logic 120 implements a credit return mechanism from IP block 130 to bridge logic 120, which returns credits whenever the buffers in IP block 130 become free. These credits are passed to arbitration logic 111 of root port 112, from shadow credit counter storage 122*a* in bridge logic 120. These credits are used by arbitration logic 111 to determine a particular type of transaction to be sent to IP block 130. Once a transaction wins outbound arbitration in the transaction layer of root port 112, it is guaranteed to be sunk by IP block 130.

While not shown for ease of illustration understand that IP logic 130 includes an initialization logic, also referred to as an idle state machine (ISM). To support PCIe style enumeration, bridge logic 120 implements a unique state (Reset state) in a corresponding ISM 127. After reset de-assertion, ISM 127 is configured to wait in the Reset state until basic input output system (BIOS) programs a given indicator (e.g., a start IOSF indicator) in a particular configuration register. Until ISM 127 is in this Reset state, initialization logic of root complex 110 is indicated to be in a PCIe Link Down state, to masquerade or simulate that the state information is being received from a physical link, although there is no off-die link to couple to root port 112. Once BIOS programs the appropriate indicator, ISM 127 proceeds through different states to finish initialization. When ISM 127 is in a credit request state, bridge logic 120 informs root port 112 that the physical layer is up (although again, there is no physical layer or off-die interconnect for this link).

At this point, ISM 127 performs credit initialization on both inbound and outbound paths. During this credit initialization, outbound credits are transmitted to root port 112 as if they are coming from a physical link. Once ISM 127 completes credit initialization, bridge logic 120 informs root port 112 that the link layer is up and at that time, root port 112 latches on the outbound credit values and saves them as initial credits received from IP logic 130

In a conventional PCIe port, the L1 state (link disable state) is treated as an Idle state and is used by power management logic to enter into a low power state. Bridge logic 120 maps an Idle condition of interconnect 135 to the L1 state of PCIe. Unlike PCIe, where power management logic instructs the link to enter into the L1 state, bridge logic ISM 127 enters the Idle state automatically when there are no transactions pending on interconnect 135. To avoid sending transactions from IP block 130 while a package including root complex 110 is in low power state, a clock is gated for IP block 130 and bridge logic 120 in this condition. On detecting a wake event, power management logic un-gates the clocks and allows transactions to make progress.

Now with reference to IP logic 130, various buffers 132, 134, 136, and 138 are present, which provide storage for data and header information of different transactions for each of multiple message classes. In an embodiment, IP logic 130 may support 3 independent interfaces, namely a primary interface, a sideband message interface and a testability and debug interface (design for test (DFT), design for debug (DFD) interface). More specifically, IP logic 130 can support 0-N primary interfaces, 0-N sideband message interfaces, and optional DFx interfaces. Interconnect 135 may be a hardware element that moves data between different agents. Note that the topology of interconnect is product specific, and can be implemented as a bus, a hierarchical bus, a cascaded hub or so forth. Interconnect 135 may be a primary interface fabric used for all in-band communication. The primary interface fabric may further enable communication of peer transactions between agents and supported fabrics. All transaction types including memory, input output (IO), configuration, and in-band messaging can be delivered via this primary interface fabric, which may act as a high performance interface for data transferred between peers and/or communications with upstream components.

In various implementations, interconnect 135 implements a split transaction protocol to achieve maximum concurrency. That is, this protocol provides for a request phase, a grant phase, and a command and data phase. Interconnect 135 supports three basic request types: posted, non-posted, and completions, in various embodiments. Generally, a posted transaction is a transaction which when sent by a source is considered complete by the source and the source does not receive a completion or other confirmation message regarding the transaction. One such example of a posted transaction may be a write transaction. In contrast, a non-posted transaction is not considered completed by the source until a return message is received, namely a completion. One example of a non-posted transaction is a read transaction in which the source agent requests a read of data. Accordingly, the completion message provides the requested data.

In addition, interconnect 135 supports the concept of distinct channels to provide a mechanism for independent data flows throughout the system. Interconnect 135 may itself include a master interface that initiates transactions and a target interface that receives transactions. The primary master interface can further be sub-divided into a request interface, a command interface, and a data interface. The request interface can be used to provide control for movement of a transaction's command and data. In various embodiments, interconnect 135 may support PCI ordering rules and enumeration.

In turn, sideband network 140 may be a standard mechanism for communicating all out-of-band information. In this way, special-purpose wires designed for a given implementation can be avoided, enhancing the ability of IP reuse across a wide variety of chips. Thus in contrast to an IP block that uses dedicated wires to handle out-of-band communications such as status, interrupt, power management, fuse distribution, configuration shadowing, test modes and so forth, sideband network 140 standardizes all out-of-band communication, promoting modularity and reducing validation requirements for IP reuse across different designs. In general, sideband network 140 may be used to communicate non-performance critical information such as interrupt and error information, rather than for performance critical data transfers, which typically may be communicated via the primary interface fabric. Understand while shown at this high level in the embodiment of FIG. 2, many variations and alternatives are possible.

Figure 3:
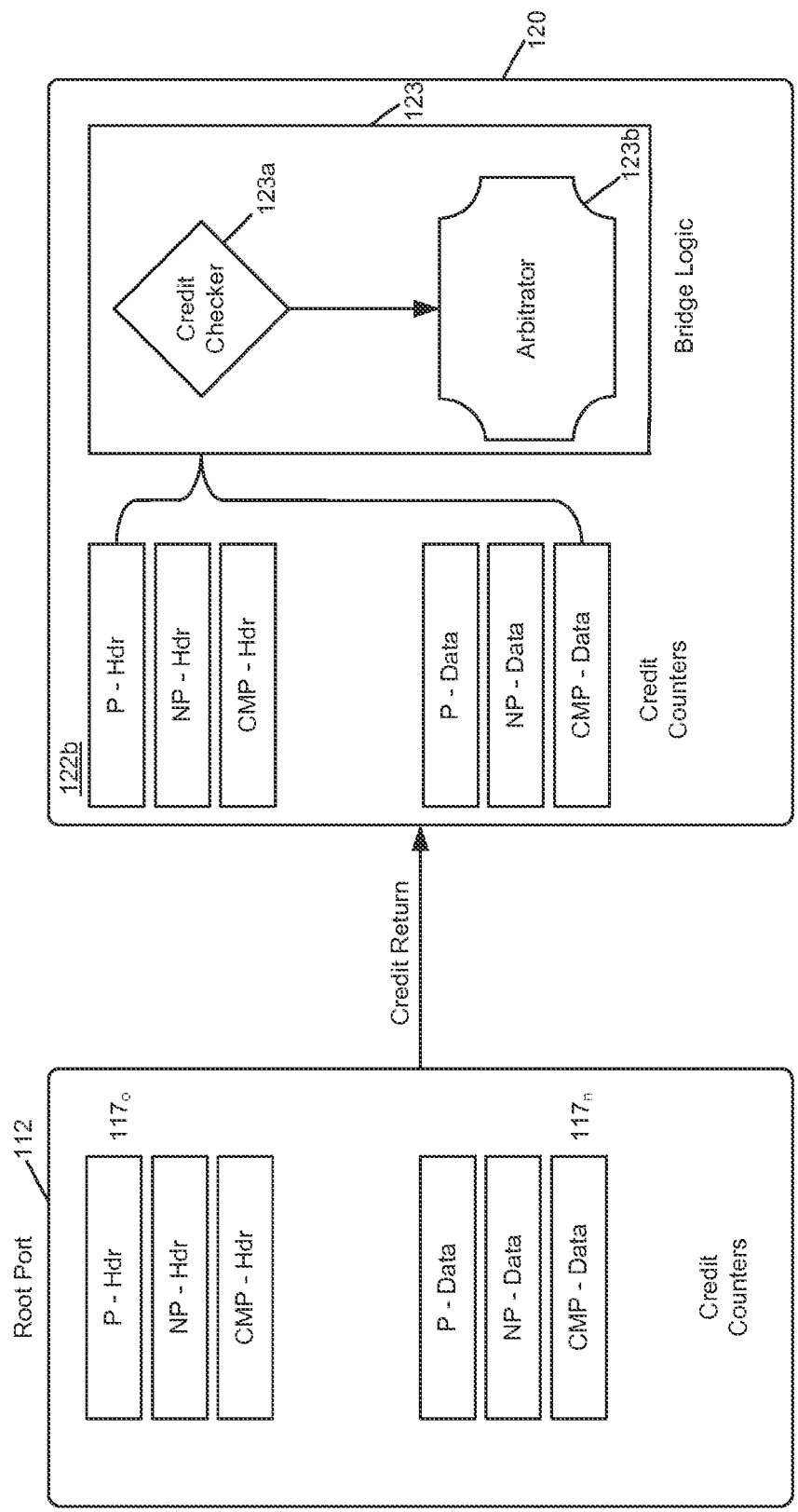
FIG. 3 is a block diagram illustrating credit handling in accordance with an embodiment of the present invention.

Referring now to FIG. 3, shown is a block diagram illustrating credit handling in accordance with an embodiment of the present invention. As shown in FIG. 3, root port 112 includes a plurality of credit counters $117_0$-$117_n$, each of which may be associated with a particular message class and information type (e.g., header or data). In an embodiment, each credit counter may be configured to maintain a count of available credits, e.g., corresponding to available space in corresponding data FIFOs 109 and header FIFOs 108 for inbound information. When such credit counters are updated when space becomes available in a given buffer, a credit return message is sent to bridge logic 120. In turn, corresponding shadow credit counters 122b are updated as appropriate.

Arbitration logic 123 is formed of constituent logics including a credit checker 123a and an arbiter 123b. Credit checker 123a is configured to determine which message classes and information types have available credits and provide this information to arbiter 123b, which may make an arbitration decision as to a transaction to be sent in the upstream or inbound direction based at least in part on this credit information. Understand while shown at this high level in FIG. 3, many variations and alternatives are possible.

Figure 4A:
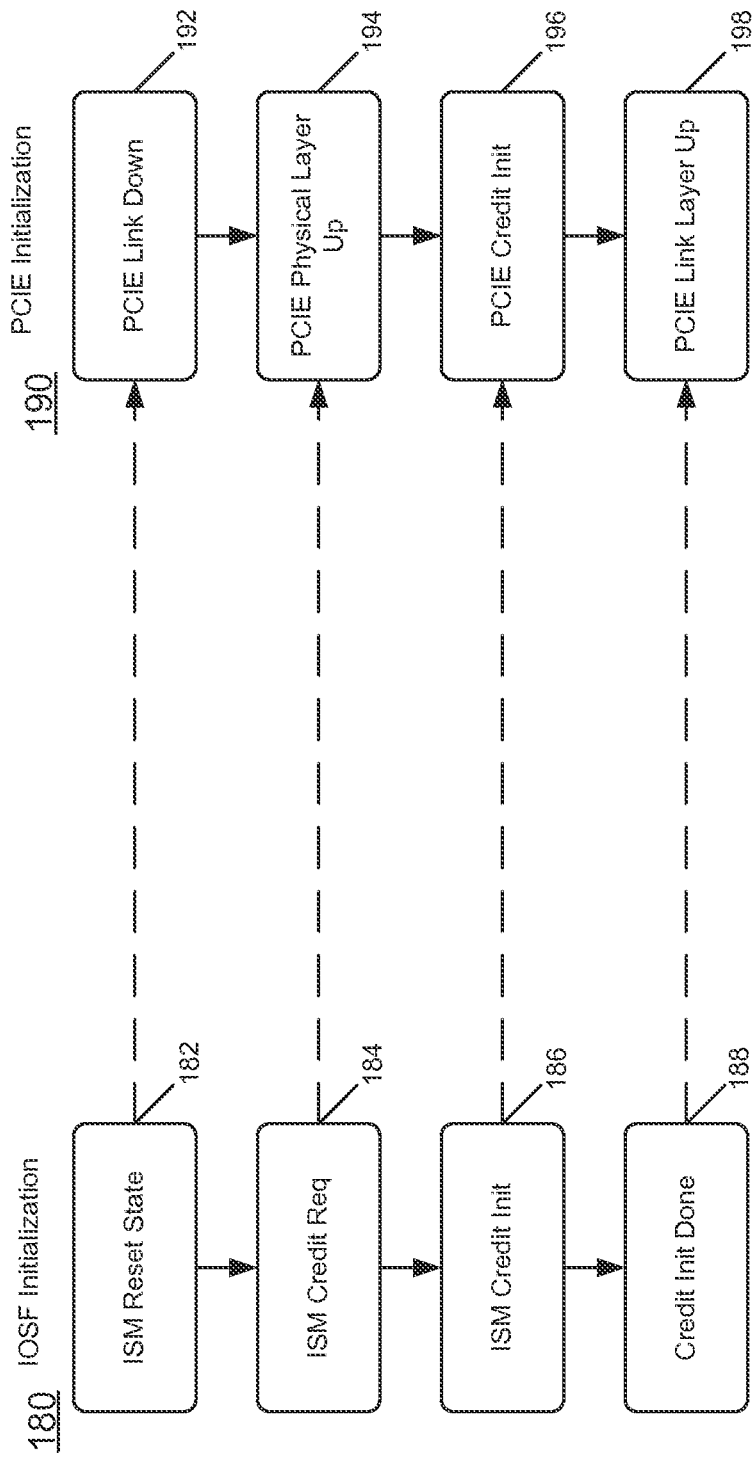
FIG. 4A is a block diagram of an example mapping between initialization states for a first link and a second link in accordance with an embodiment of the present invention.

Referring now to FIG. 4A, shown is a block diagram of an example mapping between initialization states for a first link and a second link in accordance with an embodiment of the present invention. As shown in the embodiment of FIG. 4, IOSF initialization states 180 and PCIe initialization states 190 may be mapped to each other. Note that certain of these states may be modified from the underlying communication protocol and further that to maintain mapping between these initialization states of the two different communication protocols, on at least the PCIe side, certain states are identified, even though the underlying states are not available, as a full PCIe protocol stack (including link and physical layers) is not present.

Thus as seen in FIG. 4A, an ISM reset state 182 of an IOSF protocol is mapped to a PCIe link down state 192. An ISM credit request state 184 is mapped to a PCIe physical layer up state 194. An ISM credit initialization states 186 is mapped to a PCIe credit initialization state 196. In turn, a credit initialization done state 188 is mapped to a PCIe link layer up state 198. Thus an ISM of bridge logic may map the corresponding states to enable credit allocations and other link initialization operations to occur, even though a full PCIe protocol stack is not present.

Figure 4B:
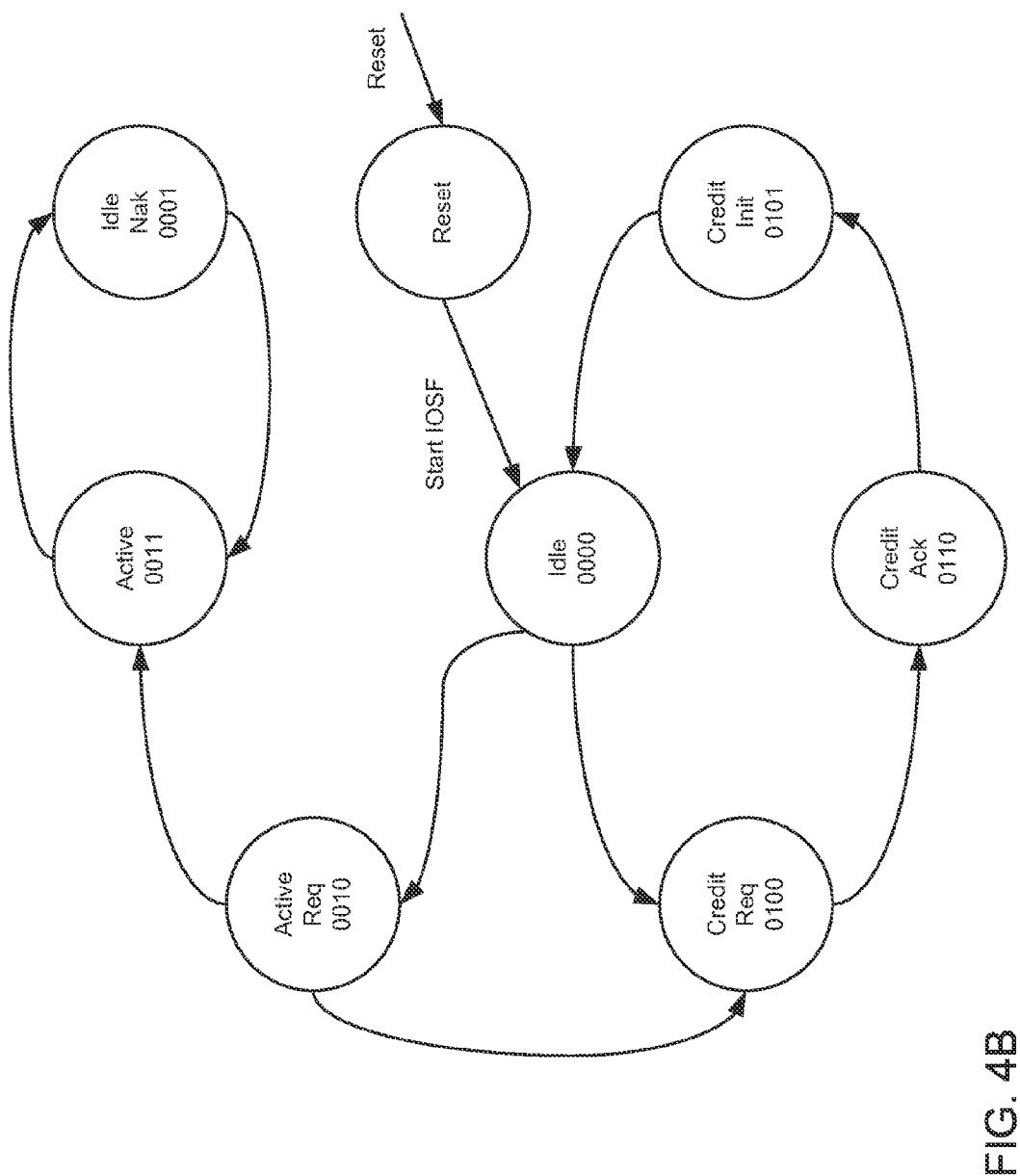
FIG. 4B is a state diagram of an idle state machine in accordance with an embodiment.

Referring now to FIG. 4B, shown is a state diagram for an idle state machine in accordance with an embodiment of the present invention. In the embodiment of FIG. 4B, the idle state machine may be of bridge logic that interfaces between an agent (e.g., of an IOSF protocol) and a PCIe fabric. As seen, on a reset, a reset state 1000 is entered. Thereafter, IOSF operations begin, and the state machine enters an idle state 0000. From this idle state, control proceeds to a credit request state 0100 or an active request state 0010. When in the credit request state, a next transition is to a credit acknowledge state 0110, and thereafter to a credit initialization state 0101 (and thereafter back to the idle state).

Still with reference to FIG. 4B, from the active request state 0010, control proceeds either to credit request state 0100, or an active state 0011. During active operations, control may iteratively proceed between active state 0011 and an idle NAK state 0001. Understand that the actual states and transitions shown in FIG. 4B are representative, and may vary in other embodiments. Furthermore, understand that the ISM represented by the states of FIG. 4B may present different states and transitions than an idle state machine for the IOSF agent (and similar control for PCIe agents and fabric).

Embodiments thus may be used to integrate IP blocks into a SoC or other processor, especially such devices integrating an IP block to couple to a PCIe root complex. As an example a processor may include one or more IP blocks which are PCIe devices, integrated into the processor (on a single die) via a PCIe secondary bus. Although the scope of the present invention is not limited in this regard, such SoC may be included in a microserver or other computing platform, where the SoC supports SRIOV on integrated devices.

Figure 5:
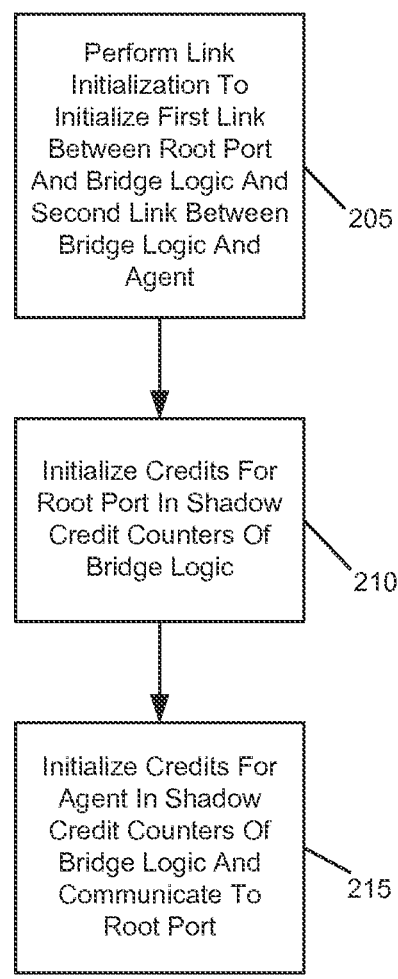
FIG. 5 is a flow diagram of a method for performing link initialization in accordance with an embodiment of the present invention.

Referring now to FIG. 5, shown is a flow diagram of a method for performing link initialization in accordance with an embodiment of the present invention. As shown in FIG. 5, method 200 may be performed by combinations of hardware, software and/or firmware such as initialization logic of a root port, as well as one or more idle state machines, such as an idle state machine of a bridge logic and an idle state machine of an agent coupled to the bridge logic. In some embodiments, such logic may be implemented as one or more microcontrollers, state machines or other hard coded logic. As seen, method 200 begins by performing link initialization to initialize a first link between the root port and the bridge logic and further to initialize a second link between the bridge logic and the agent (block 205). Next, control passes to block 210 where credits are initialized for the root port in shadow credit counters of the bridge logic. These shadow credit counters may take the form of a set of credit counters corresponding to credit counters present in the root port such that information regarding available credits in the root port is available to the bridge logic. At block 215 credits may be initialized for the agent in shadow credit counters of the bridge logic. Still further, this information regarding available credits also may be communicated to the root port itself, namely a transaction layer of the root port. By providing this credit information of the agent to the root port itself, an arbitration logic of the root port can base its arbitration decisions at least in part on available credit information, such that when a transaction is selected and output by the root port, it is guaranteed to be successfully received and stored in an available buffer of the agent. Understand while shown at this high level in the embodiment of FIG. 5, many variations and alternatives are possible.

Figure 6:
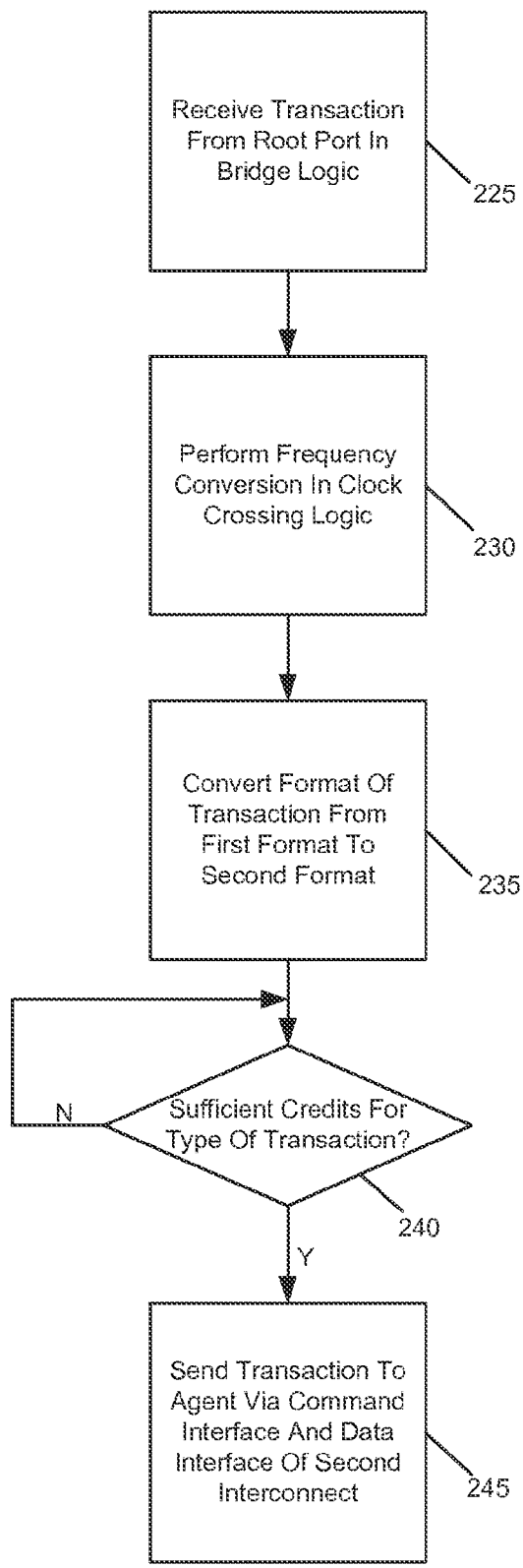
FIG. 6 is a flow diagram of a method for communicating a transaction from a root port to a downstream agent in accordance with an embodiment of the present invention.

Referring now to FIG. 6, shown is a flow diagram of a method for communicating a transaction from a root port to a downstream agent in accordance with an embodiment of the present invention. As shown in FIG. 6, method 220 may be performed by various logic of root port, bridge logic and agent, as described above.

At block 225 a transaction is received in the bridge logic from the root port. Understand that this transaction may be of one of different types, e.g., posted, non-posted or completion, and may include various header, command and payload information. At block 230, a frequency conversion may be performed in clock crossing logic of the bridge logic. In an embodiment, an AGF may be used to perform clock crossing operations such that data received from a root port at a first frequency can be output to an agent at a second, potentially different frequency.

Still with reference to FIG. 6, control next passes to block 235 where a format of the transaction can be converted. More specifically, a PCIe transaction received according to a format of a PCIe protocol can be converted to a format of an IOSF protocol. Understand while the example described herein is with regard to PCIe/IOSF communications, the scope of the present invention is not limited in this regard and communications between other protocols are possible in other embodiments. Note that this format conversion may include separating header and data information present in the PCIe packet into separate command and data portions for communication on separate command and data paths of a primary interface of an IOSF interconnect. Control next passes to diamond 240 to determine whether sufficient credits are available in the agent for the given type of transaction. If so, control passes to block 245 where the transaction is sent to the agent via separate command and data interfaces of the second interconnect. Otherwise, the transaction may be maintained in a buffer or other storage of the bridge logic until such credits are available (such that control passes from diamond 240 to block 245 for transmission of such transaction). Understand while shown at this high level in the embodiment of FIG. 6, many variations and alternatives are possible.

Figure 7:
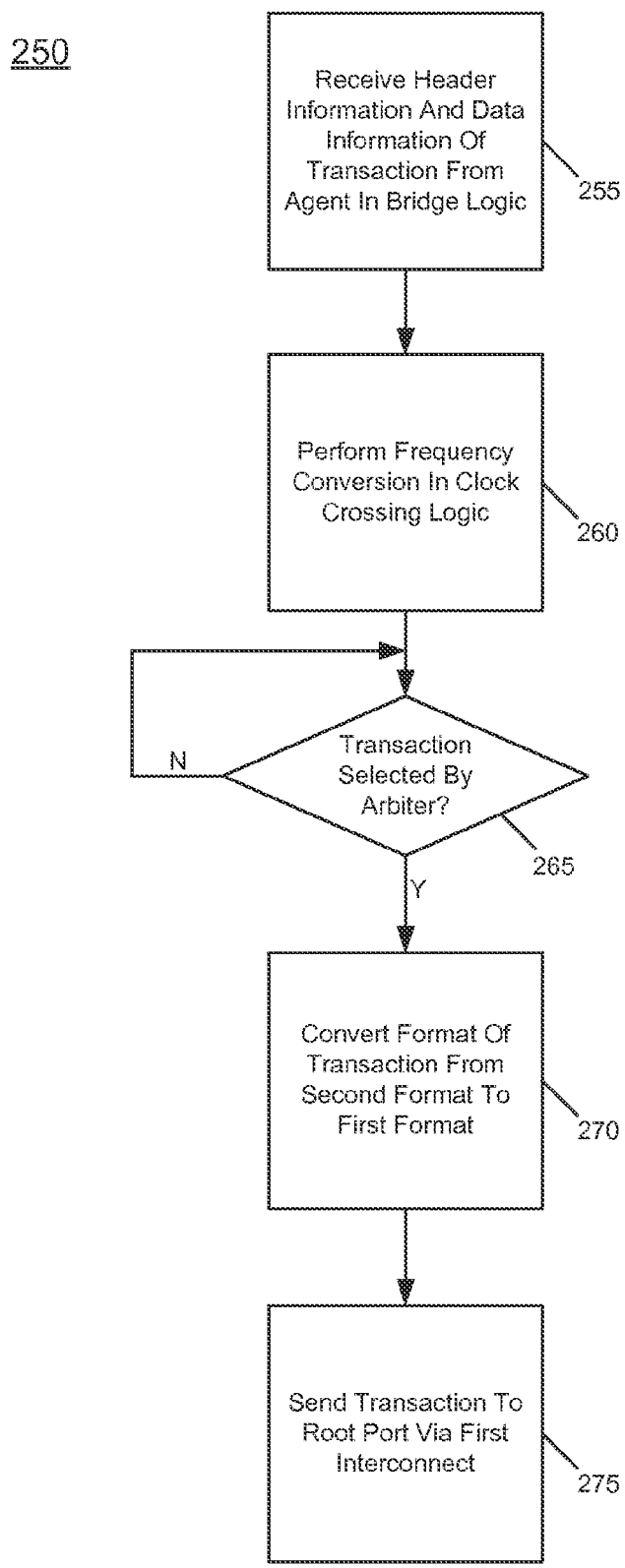
FIG. 7 is a flow diagram of a method for communicating a transaction from a downstream agent to a root port in accordance with an embodiment of the present invention.

Referring now to FIG. 7, shown is a flow diagram of a method for communicating a transaction from a downstream agent to a root port in accordance with an embodiment of the present invention. As shown in FIG. 7, method 220 may be performed by various logic of root port, bridge logic and agent, as described above.

As seen in FIG. 7, method 250 begins by receiving header information and data information of a transaction in bridge logic from the agent (block 255). At block 260, a frequency conversion may be performed in a clock crossing logic (e.g., an AGF). Next, it is determined whether the given transaction has been selected by an arbiter (diamond 265). Although the scope of the present invention is not limited in this regard, such arbitration may be performed in arbitration logic of the bridge logic, and may be based on a determination as to whether sufficient credits are available in the root port for the given type of transaction, at a priority of the transaction, and/or based on other information. When a given transaction is selected, control passes to block 270 where the transaction format may be converted from the second format and to the first format. For example, separate command and data information of the transaction can be merged into a combined transaction. Thereafter, control passes to block 275 where the transaction is sent to the root port via the first interconnect. Understand while shown at this high level in the embodiment of FIG. 7, many variations and alternatives are possible.

Figure 8:
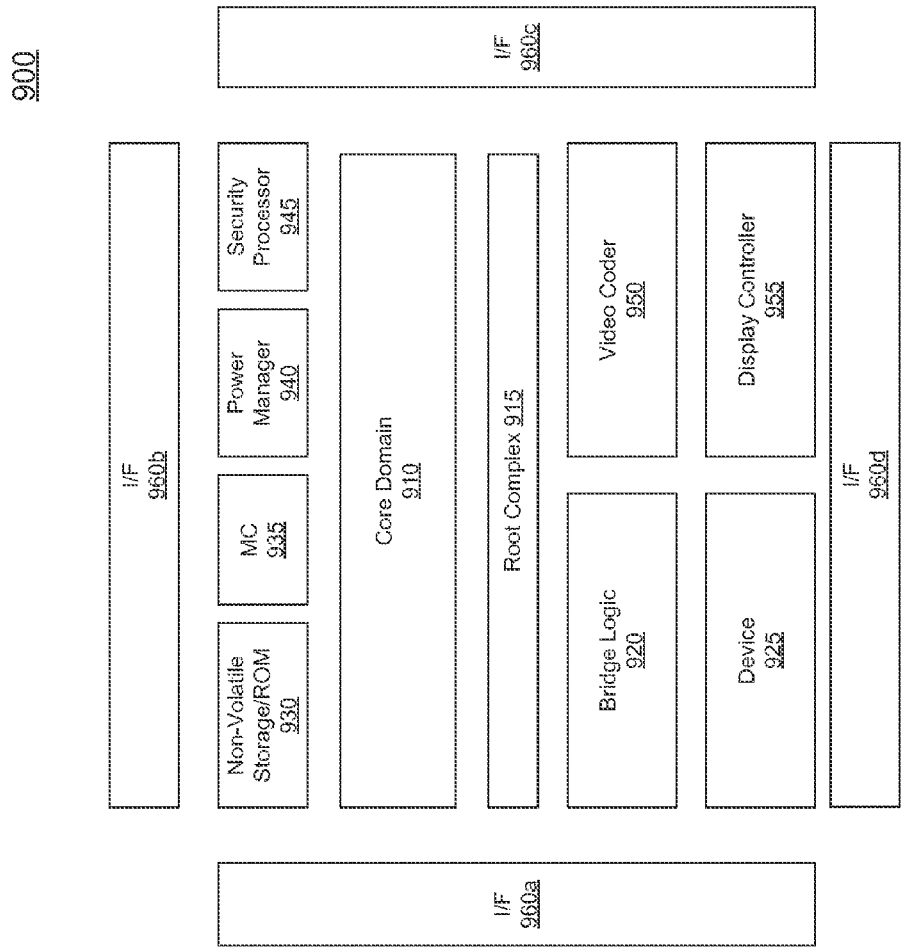
FIG. 8 is a block diagram of a system in accordance with an embodiment of the present invention.

Understand that processors or SoCs (or other integrated circuits) including integrated devices as described herein can be used in many different systems, ranging from small portable devices to high performance computing systems and networks. Referring now to FIG. 8, shown is a block diagram of a system in accordance with an embodiment of the present invention. In the embodiment of FIG. 8, system 900 may be a SoC including multiple domains, each of which may be controlled to operate at an independent operating voltage and operating frequency. As a specific illustrative example, system 900 may be an Intel® Architecture Core™-based SoC such as an i3, i5, i7 or another such processor available from Intel Corporation. However, other low power SoCs or processors such as available from Advanced Micro Devices, Inc. (AMD) of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer, IoT device, wearable, or other portable computing device.

In the high level view shown in FIG. 8, SoC 900 includes core domain 910 including a plurality of cores. Core domain 910 may include one or more processor cores, one or more cache memories and other circuitry. Each core of the domain may support one or more instructions sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level (L2) cache memory. A non-volatile storage 930 may be used to store various program and other data. For example, this storage may be used to store at least portions of microcode, boot information such as a BIOS, other system software or so forth.

Core domain 910 may also include an interface such as a network interface to enable interconnection to additional circuitry of the SoC. In an embodiment, core domain 910 couples to a root complex 915 and to a memory controller 935. In turn, memory controller 935 controls communications with a memory such as a DRAM (not shown for ease of illustration in FIG. 8).

Root complex 915 may include a variety of root ports, including conventional PCIe reports having full transaction, link and physical layers and root ports as described herein that include only a transaction layer to interface to a bridge logic 920. Understand that while a single bridge logic 920 is shown for ease of illustration, multiple bridge logics may be provided, each to interface between a corresponding root port of root complex 915 and a corresponding device 925, which may be an integrated device, such as a special-purpose processor, accelerator or other such device. Bridge logic 920 may be configured to interface between the transaction layer of a corresponding root port and a given device 925 and to perform the various initialization, credit management, transaction and frequency conversions and power state management operations described herein.

Other accelerators also may be present. In the illustration of FIG. 8, a video coder 950 may perform coding operations including encoding and decoding for video information, e.g., providing hardware acceleration support for high definition video content. A display controller 955 further may be provided to accelerate display operations including providing support for internal and external displays of a system. In addition, a security processor 945 may be present to perform security operations. Each of the units may have its power consumption controlled via a power manager 940, which may include control logic to perform various power management techniques.

In some embodiments, SoC 900 may further include a non-coherent fabric coupled to the coherent fabric to which various peripheral devices may couple. One or more interfaces 960a-960d enable communication with one or more off-chip devices. Such communications may be according to a variety of communication protocols such as PCIe™, GPIO, USB, I²C, UART, MIPI, SDIO, DDR, SPI, HDMI, among other types of communication protocols. Although shown at this high level in the embodiment of FIG. 8, understand the scope of the present invention is not limited in this regard.

Figure 9:
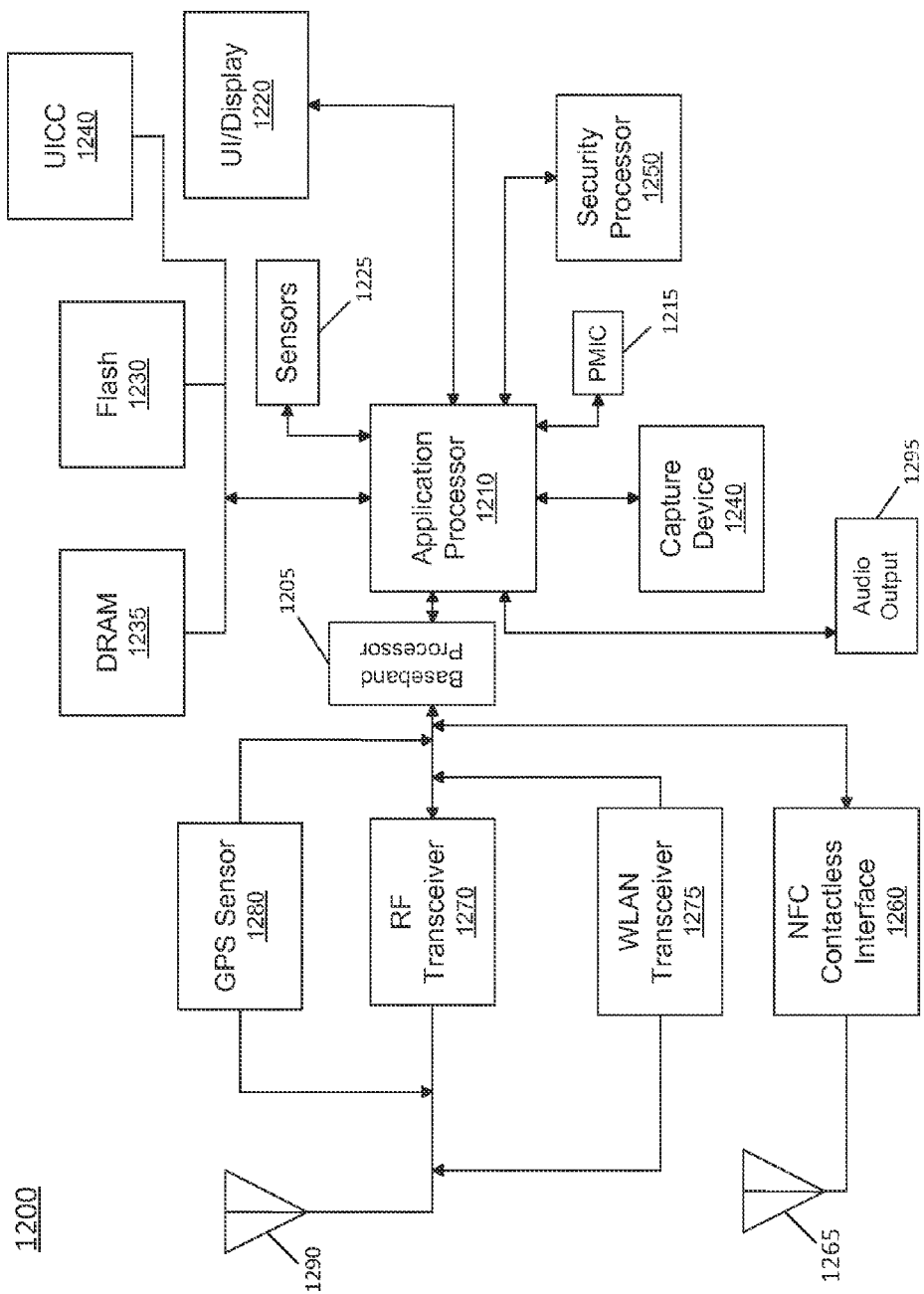
FIG. 9 is a block diagram of an example system with which embodiments can be used.

Referring now to FIG. 9, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main SoC of the system to execute an OS and other system software, in addition to user applications such as many well-known social media and multimedia apps. Application processor 1210 may further be configured to perform a variety of other computing operations for the device, and may include an on-die interconnect architecture as described herein, including root ports, bridge logic and integrated devices.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 9, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 9, understand that in some implementations one antenna or a different set of antennae may be provided to enable various wireless functionality.

A power management integrated circuit (PMIC) 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications, such as according to a Bluetooth™ standard or an IEEE 802.11 standard such as IEEE 802.11a/b/g/n can also be realized.

Figure 10:
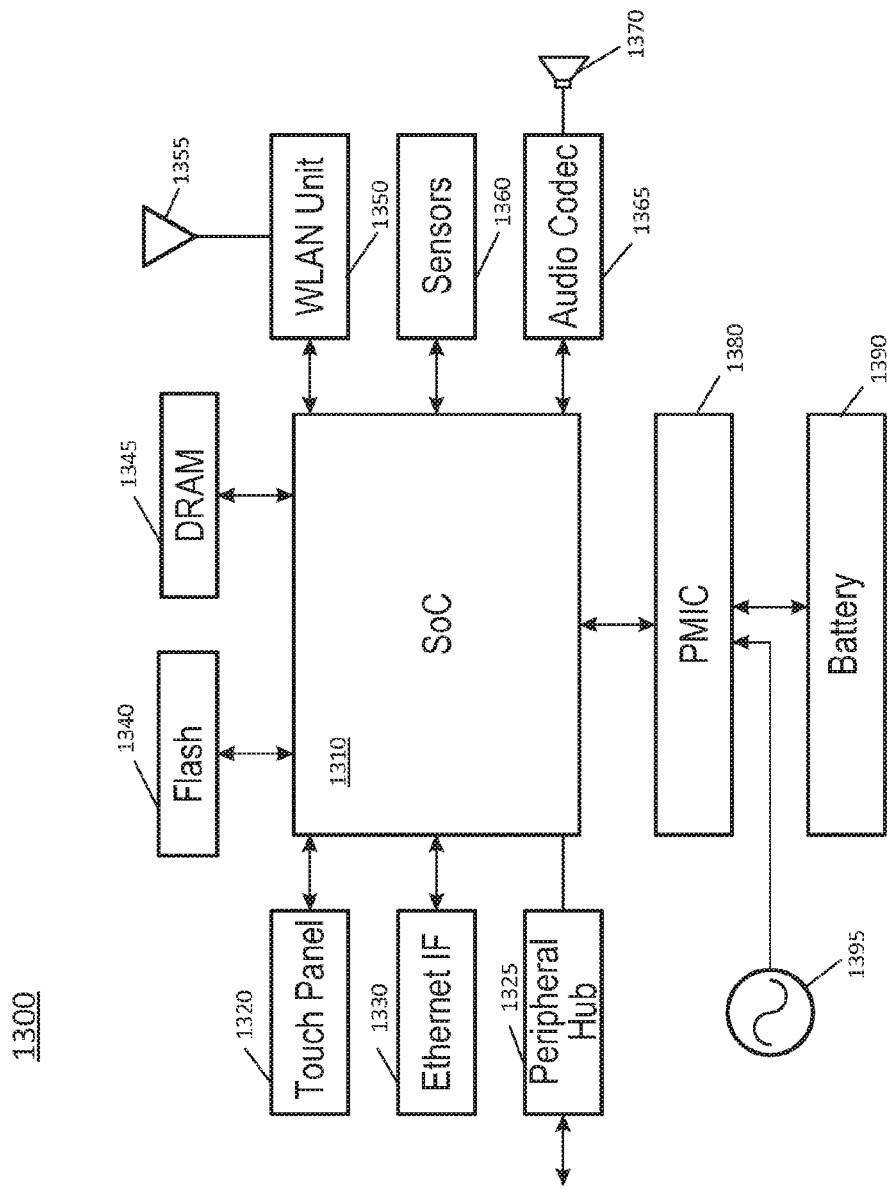
FIG. 10 is a block diagram of another example system with which embodiments may be used.

Referring now to FIG. 10, shown is a block diagram of another example system with which embodiments may be used. In the illustration of FIG. 10, system 1300 may be mobile low-power system such as a tablet computer, 2:1 tablet, phablet or other convertible or standalone tablet system. As illustrated, a SoC 1310 is present and may be configured to operate as an application processor for the device. SoC 1310 may include an on-die interconnect architecture as described herein, including root ports, bridge logic, and integrated devices.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 10, to provide for wireless capabilities, a WLAN unit 1350 is coupled to SoC 1310 and in turn to an antenna 1355. In various implementations, WLAN unit 1350 may provide for communication according to one or more wireless protocols, including an IEEE 802.11 protocol, a Bluetooth™ protocol or any other wireless protocol.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 10, many variations and alternatives are possible.

Figure 11:
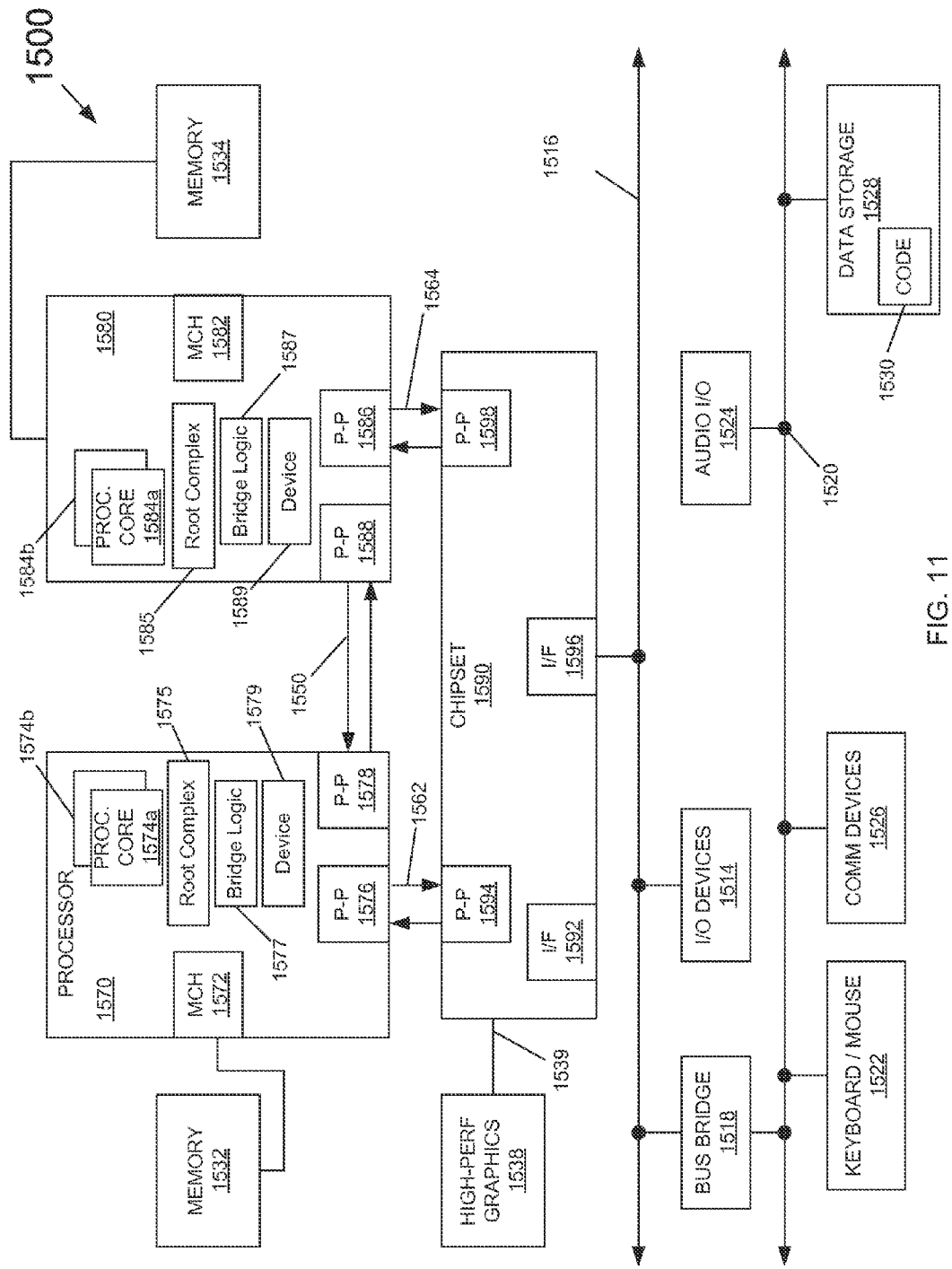
FIG. 11 is a block diagram of a system in accordance with an embodiment of the present invention.

Referring now to FIG. 11, shown is a block diagram of a system in accordance with an embodiment of the present invention. As shown in FIG. 11, multiprocessor system 1500 such as a high performing computing system that may in turn couple to other systems of a HPC network. System 1500 includes a first processor 1570 and a second processor 1580 coupled via a point-to-point interconnect 1550. As shown in FIG. 11, each of processors 1570 and 1580 may be many core processors including representative first and second processor cores (i.e., processor cores 1574*a* and 1574*b* and processor cores 1584*a* and 1584*b*). Each processor 1570 and 1580 further may include a root complex 1575 and 1585 as described herein, including both conventional root ports and transaction layer-based root ports. In turn, such root ports interface via corresponding bridge logics 1577 and 1587 with an integrated device 1579 and 1589, which may be any desired type of special-purpose processor, accelerator, or other desired device to be integrated into the processor.

Still referring to FIG. 11, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 11, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 11, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 11, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520.

Figure 12:
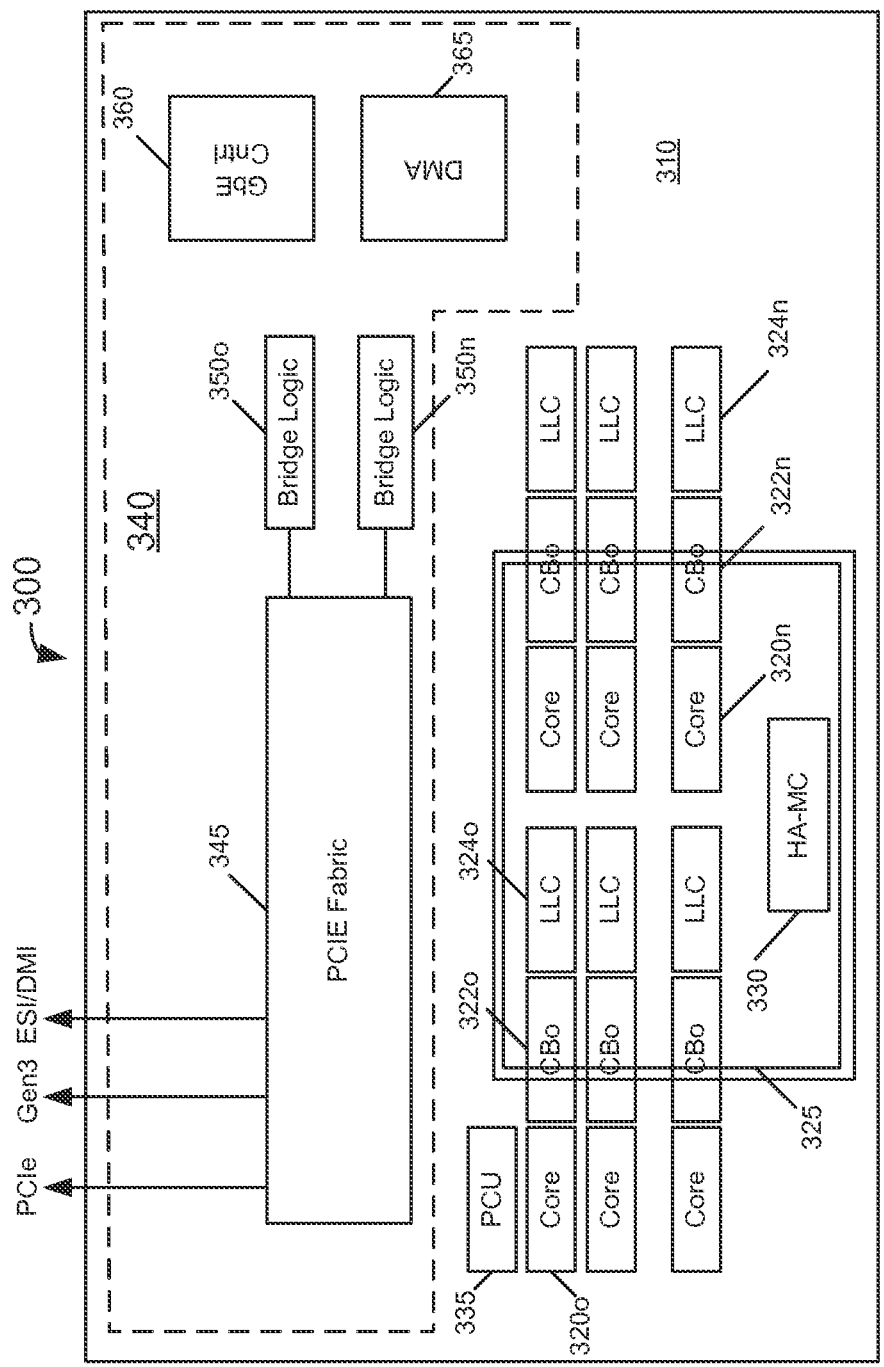
FIG. 12 is a block diagram of a system on chip accordance with an embodiment of the present invention.

Referring now to FIG. 12, shown is a block diagram of a system on-chip in accordance with another embodiment of the present invention. As shown in FIG. 12, SoC 300 may include a core domain 310 and a peripheral domain 340, which may be implemented as an integrated I/O (IIO) hub. In general, core domain 310 includes a plurality of cores $320_0$-$320_n$, each of which is coupled to a local portion of a shared cache memory, namely a given slice of a last level cache (LLC) $324_0$-$324_n$, by way of a cache controller $322_0$-$322_n$. As further illustrated, core domain 310 also includes a home agent/memory controller 330, which may interface with an off-chip memory, such as a DRAM. In addition, a power control unit (PCU) 335 may be integrated within core domain 310.

Still with reference to FIG. 12, IIO hub 340 includes a PCIe fabric 345, which may include circuitry in accordance with an embodiment to enable interfacing, via corresponding bridge logic $350_0$-$350_n$ with on-chip devices of a another protocol frenzy e.g. of an IOS protocol). As shown in the illustration of FIG. 12, such devices may include a gigabit Ethernet (GbE) controller 360, and a direct memory access engine 365. As further illustrated, PCIe fabric 345 may couple via given links to various off-chip peripheral devices, such via one or more PCIe links (e.g., PCIe Gen 3 links, and/or an enterprise Southbridge interface/direct media interface (ESI/DMI) link) Understand while shown at this high level in the embodiment of FIG. 12, many variations and alternatives are possible.

The following examples pertain to further embodiments.

In one example, an apparatus comprises: a semiconductor die including but not limited to: at least one core to execute instructions; an agent to perform at least one function; a root complex including a first root port to interface to a first device to be coupled to the apparatus via a first interconnect and a second root port to interface to the agent via a bridge logic; and the bridge logic to interface the second root port to the agent, convert a first transaction from the first root port having a first format to a second format and communicate the first transaction having the second format to the agent.

In an example, the bridge logic comprises: a first format conversion logic to convert the first transaction having the first format to the first transaction having the second format; and a second format conversion logic to convert a second transaction from the agent having the second format to the second transaction having the first format.

In an example, the first format conversion logic is to separate command information and data information of the first transaction and communicate the command information on a first interface of a second interconnect of the semiconductor die coupled between the bridge logic and the agent and communicate the data information on a second interface of the second interconnect; and the second format conversion logic is to receive command information of the second transaction on a third interface of the second interconnect and receive data information of the second transaction on a fourth interface of the second interconnect, and communicate the command information and the data information to the second root port on a single interface.

In an example, the bridge logic comprises a first shadow credit counter to maintain credits available in the second root port, the first shadow credit counter to mirror credit information of a credit counter of the second root port.

In an example, the bridge logic further comprises an arbitration logic to select a transaction to forward from the agent to the second root port based at least in part on information in the first shadow credit counter.

In an example the bridge logic further comprises a clock crossing logic.

In an example, the bridge logic further comprises an idle state machine to map an initialization process for a first interconnect protocol to an initialization process for a second interconnect protocol.

In an example, the idle state machine of the bridge logic is to cause an initialization logic of the second root port to be in a physical layer up state responsive to a credit request state for an idle state machine of the agent.

In an example, the idle state machine of the bridge logic is to cause the initialization logic of the second root port to be in a link layer up state responsive to a credit done state of the idle state machine of the agent.

In an example, the first root port includes a transaction layer, a link layer, and a physical layer, and the second root port includes a transaction layer and does not include a link layer or a physical layer.

In an example, the second root port comprises a transaction layer to interface with the bridge logic, without a link layer or a physical layer.

In an example, the root complex comprises: an interrupt handler to receive an interrupt from the agent via a sideband network coupled between the agent and the root complex, the interrupt handler to process the interrupt and to provide interrupt information to the second root port; and an error handler to receive an error indication from the agent via the sideband network, the error handler to process the error indication and to provide error information to the second root port.

In an example, the second root port is to enumerate a non-zero bus number to the agent to cause the agent to enable a plurality of virtual functions to share at least one resource of the agent.

In an example, the apparatus may be a processor that can be implemented using various means.

In an example, the processor comprises a SoC incorporated in a user equipment touch-enabled device.

In another example, a system comprises a display and a memory, and includes the processor of one or more of the above examples.

In another example, a system comprises: a SoC having a semiconductor die including but not limited to: at least one core to execute instructions; an agent including at least one resource to be shared by a plurality of functions, the agent of a second communication protocol; a root complex including a first root port to interface to a first device coupled to the SoC and a second root port to enumerate a non-zero bus number for the agent; and a bridge logic to interface a transaction layer of the second root port to the agent, the bridge logic including an arbitration logic to select one of a plurality of requests from the agent and to send a grant to the agent to enable the agent to send a transaction corresponding to the selected request to the bridge logic, the transaction directed to the second root port. The system may further include the first device coupled to the SoC via a first interconnect of a first communication protocol.

In an example, the bridge logic comprises: a first format conversion logic to convert the transaction of the second communication protocol to the first communication protocol; and a second format conversion logic to convert a second transaction of the first communication protocol from the second root port to the second communication protocol.

In an example, the bridge logic comprises a first shadow credit counter to maintain credits available in the second root port, the first shadow credit counter to mirror credit information of a credit counter of the second root port.

In an example, the bridge logic further comprises: a clock crossing logic; and an idle state machine to map an initialization process for the first communication protocol to an initialization process for the second communication protocol.

In an example, the idle state machine of the bridge logic is to cause an initialization logic of the second root port to be in a physical layer up state responsive to a credit request state for an idle state machine of the agent, and to cause the initialization logic of the second root port to be in a link layer up state responsive to a credit done state of the idle state machine of the agent.

In a still further example, a method comprises: initializing a first link coupled between a root port of a root complex and a bridge logic, the first link to communicate at a transaction level; initializing a second link coupled between the bridge logic and an agent, where the second link is of a second communication protocol and the first link is of a first communication protocol; initializing a first set of credit counters of the bridge logic with initial credit values corresponding to initial credit values of associated credit counters of the root port; and initializing a second set of credit counters of the bridge logic with initial credit values corresponding to initial credit values of associated credit counters of the agent, and communicating the initial credit values of the second set of credit counters to the root port.

In an example, the method further comprises: receiving a first transaction in the bridge logic from the agent; converting the first transaction from a format of the second communication protocol to a format of the first communication protocol; and sending the first transaction having the format of the first communication protocol to the root port based at least in part on information in the first set of credit counters.

In an example, the method further comprises performing a frequency conversion for the first transaction in clock crossing logic of the bridge logic.

In an example, the method further comprises sending the first transaction to the root port if a first credit counter of the first set of credit counters indicates that available space is present in the root port for the first transaction, the available space associated with a type of the first transaction.

In an example, the method further comprises receiving the first transaction from the agent as a split transaction including a header portion and a data portion and sending the first transaction to the root port serially.

In an example, the method further comprises: receiving a first request put from the agent in the bridge logic, the first request put to request transmission of the first transaction from the agent to the root port; sending a grant message to the agent to enable the agent to send the first transaction, based at least in part on information stored in the first set of credit counters; receiving the first transaction from the agent, converting the first transaction from the format of the second communication protocol to the format of the first communication protocol, and sending to the root port the second transaction having the format of the first communication protocol.

In an example, the method further comprises: entering an idle state of an idle state machine of the bridge logic when there are no pending transactions for the agent; and thereafter gating at least a portion of the agent and at least a portion of the bridge logic.

In an example, the method further comprises ungating the at least portion of the bridge logic and ungating the at least portion of the agent responsive to a wake event.

In another example, a computer readable medium including instructions is to perform the method of any of the above examples.

In another example, an apparatus comprises means for performing the method of any one of the above examples.

In another example, a computer readable medium including data is to be used by at least one machine to fabricate at least one integrated circuit to perform the method of any one of the above examples.

Understand that various combinations of the above examples are possible.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, non-transitory machine-readable medium, at least temporarily, an article, such as information encoded into a carrier wave, embodying techniques of embodiments of the present invention.

A module or logic as used herein refers to any combination of hardware, software, and/or firmware. As an example, a module or logic includes hardware, such as a micro-controller, associated with a non-transitory medium to store code adapted to be executed by the micro-controller. Therefore, reference to a module or logic, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a semiconductor die comprising:
     at least one core to execute instructions;
     an agent to perform at least one function;
     a root complex including a first root port to interface to a first device to be coupled to the apparatus via a first interconnect and a second root port to interface to the agent via a bridge logic; and
     the bridge logic to interface the second root port to the agent, convert a first transaction from the first root port having a first format to a second format and communicate the first transaction having the second format to the agent.

2. The apparatus of claim 1, wherein the bridge logic comprises:
   a first format conversion logic to convert the first transaction having the first format to the first transaction having the second format; and
   a second format conversion logic to convert a second transaction from the agent having the second format to the second transaction having the first format.

3. The apparatus of claim 2, wherein the first format conversion logic is to separate command information and data information of the first transaction and communicate the command information on a first interface of a second interconnect of the semiconductor die coupled between the bridge logic and the agent and communicate the data information on a second interface of the second interconnect; and wherein the second format conversion logic is to receive command information of the second transaction on a third interface of the second interconnect and receive data information of the second transaction on a fourth interface of the second interconnect, and communicate the command information and the data information to the second root port on a single interface.

4. The apparatus of claim 1, wherein the bridge logic comprises a first shadow credit counter to maintain credits available in the second root port, the first shadow credit counter to mirror credit information of a credit counter of the second root port.

5. The apparatus of claim 4, wherein the bridge logic further comprises an arbitration logic to select a transaction to forward from the agent to the second root port based at least in part on information in the first shadow credit counter.

6. The apparatus of claim 4, wherein the bridge logic further comprises a clock crossing logic.

7. The apparatus of claim 4, wherein the bridge logic further comprises an idle state machine to map an initialization process for a first interconnect protocol to an initialization process for a second interconnect protocol.

8. The apparatus of claim 7, wherein the idle state machine of the bridge logic is to cause an initialization logic of the second root port to be in a physical layer up state responsive to a credit request state for an idle state machine of the agent.

9. The apparatus of claim 8, wherein the idle state machine of the bridge logic is to cause the initialization logic of the second root port to be in a link layer up state responsive to a credit done state of the idle state machine of the agent.

10. The apparatus of claim 1, wherein the first root port includes a transaction layer, a link layer, and a physical layer, and the second root port includes a transaction layer and does not include a link layer or a physical layer.

11. The apparatus of claim 1, wherein the second root port comprises a transaction layer to interface with the bridge logic, without a link layer or a physical layer.

12. The apparatus of claim 1, wherein the root complex comprises:
   an interrupt handler to receive an interrupt from the agent via a sideband network coupled between the agent and the root complex, the interrupt handler to process the interrupt and to provide interrupt information to the second root port; and
   an error handler to receive an error indication from the agent via the sideband network, the error handler to process the error indication and to provide error information to the second root port.

13. The apparatus of claim 1, wherein the second root port is to enumerate a non-zero bus number to the agent to cause the agent to enable a plurality of virtual functions to share at least one resource of the agent.

14. A system comprising:
   a system on chip (SoC) having a semiconductor die comprising:
     at least one core to execute instructions;
     an agent including at least one resource to be shared by a plurality of functions, the agent of a second communication protocol;
     a root complex including a first root port to interface to a first device coupled to the SoC and a second root port to enumerate a non-zero bus number for the agent and to interface to the agent via a bridge logic; and the bridge logic to interface a transaction layer of the second root port to the agent, the bridge logic including an arbitration logic to select one of a plurality of requests from the agent and to send a grant to the agent to enable the agent to send a transaction corresponding to the selected request to the bridge logic, the transaction of the second communication protocol and directed to the second root port, the bridge logic to convert the transaction from the agent having the second communication protocol to a first communication protocol and communicate the transaction having the first communication protocol to the second root port; and the first device coupled to the SoC via a first interconnect of the first communication protocol.

15. The system of claim 14, wherein the bridge logic comprises:

a first format conversion logic to convert the transaction of the second communication protocol to the first communication protocol; and a second format conversion logic to convert a second transaction of the first communication protocol from the second root port to the second communication protocol.

16. The system of claim 14, wherein the bridge logic comprises a first shadow credit counter to maintain credits available in the second root port, the first shadow credit counter to mirror credit information of a credit counter of the second root port.

17. The system of claim 16, wherein the bridge logic further comprises:

a clock crossing logic; and an idle state machine to map an initialization process for the first communication protocol to an initialization process for the second communication protocol.

18. The system of claim 17, wherein the idle state machine of the bridge logic is to cause an initialization logic of the second root port to be in a physical layer up state responsive to a credit request state for an idle state machine of the agent, and to cause the initialization logic of the second root port to be in a link layer up state responsive to a credit done state of the idle state machine of the agent.

19. A system comprising:

an apparatus having a semiconductor die including at least one core to execute instructions, an agent to perform at least one function, a root complex including a first root port to interface to a first device to be coupled to the apparatus via a first interconnect and a second root port to interface to the agent via a bridge logic, and the bridge logic to interface the second root port to the agent, convert a first transaction from the first root port having a first format to a second format and communicate the first transaction having the second format to the agent; and a system memory coupled to the apparatus.

20. The system of claim 19, wherein the apparatus comprises a system on chip.

21. The system of claim 19, wherein the bridge logic comprises a first shadow credit counter to maintain credits available in the second root port, the first shadow credit counter to mirror credit information of a credit counter of the second root port.

22. The system of claim 21, wherein the bridge logic further comprises an arbitration logic to select a transaction to forward from the agent to the second root port based at least in part on information in the first shadow credit counter.

23. The system of claim 21, wherein the bridge logic further comprises an idle state machine to map an initialization process for a first interconnect protocol to an initialization process for a second interconnect protocol.

24. The system of claim 19, wherein the bridge logic further comprises a clock crossing logic.

25. The system of claim 19, wherein the first root port includes a transaction layer, a link layer, and a physical layer, and the second root port includes a transaction layer and does not include a link layer or a physical layer.

26. The system of claim 19, wherein the second root port comprises a transaction layer to interface with the bridge logic, without a link layer or a physical layer.

* * * * *